US011566639B2

(12) United States Patent
Kubo

(10) Patent No.: US 11,566,639 B2
(45) Date of Patent: Jan. 31, 2023

(54) SERVO VALVE UNIT AND APPARATUS

(71) Applicant: EISHIN TECHNOLOGY CO., LTD, Kanagawa (JP)

(72) Inventor: Chikanari Kubo, Kanagawa (JP)

(73) Assignee: EISHIN TECHNOLOGY CO., LTD, Kanagawa (JP)

( * ) Notice: Subject to any disclaimer, the term of this patent is extended or adjusted under 35 U.S.C. 154(b) by 121 days.

(21) Appl. No.: 17/057,857

(22) PCT Filed: Jan. 10, 2020

(86) PCT No.: PCT/JP2020/000715
§ 371 (c)(1),
(2) Date: Nov. 23, 2020

(87) PCT Pub. No.: WO2020/158352
PCT Pub. Date: Aug. 6, 2020

(65) Prior Publication Data
US 2021/0199139 A1    Jul. 1, 2021

(30) Foreign Application Priority Data

Jan. 29, 2019   (JP) .................... PCT/JP2019/002971

(51) Int. Cl.
*F16K 11/22*    (2006.01)
*F15B 9/03*    (2006.01)
(Continued)

(52) U.S. Cl.
CPC .................. *F15B 9/03* (2013.01); *F15B 9/09* (2013.01); *F16K 11/22* (2013.01); *F16K 31/42* (2013.01)

(58) Field of Classification Search
CPC .. F15B 9/03; F15B 9/09; F15B 13/044; F15B 13/0405; F16K 31/42; F16K 31/423;
(Continued)

(56) References Cited

U.S. PATENT DOCUMENTS 2,942,837 A * 6/1960 Bauerlein ............. F16K 31/404
251/28
2,955,608 A * 10/1960 Stone ...................... F16K 11/24
137/100
(Continued)

FOREIGN PATENT DOCUMENTS

EP    1136703 A1    9/2001
GB    1301236 A    12/1972
(Continued)

OTHER PUBLICATIONS

International Search Report for PCT/JP2019/002971, dated May 7, 2019, 2 pages.
(Continued)

*Primary Examiner* — Kelsey E Cary
(74) *Attorney, Agent, or Firm* — Cozen O'Connor

(57) ABSTRACT

A servo valve for precisely controlling a position of a pneumatic cylinder does not require a servo amplifier and a small sized and/or high durability servo valve unit. The servo valve comprises a unit body having first and second portions, first and second valve portions, first and second seal members that open and close the first and second valve portions, respectively, first and second drive mechanisms that drive first and second seal members by first and second electric pulses, respectively, a supply flow path between the first end and first valve, an exhaust flow path between the second end and second valve, a common flow path connected to the supply and exhaust flow paths via first and second valve portions, and a drive flow path connected to the pneumatic actuator. First and second drive mechanisms are arranged in a drive mechanism arrangement portion located between first and second end portions.

13 Claims, 10 Drawing Sheets

(51) Int. Cl.
*F15B 9/09* (2006.01)
*F16K 31/42* (2006.01)

(58) Field of Classification Search
CPC .. F16K 31/0606; F16K 31/0624; F16K 11/20; F16K 11/22; F16K 11/24; F16K 11/10
See application file for complete search history.

(56) References Cited

U.S. PATENT DOCUMENTS

| | | | | |
|---|---|---|---|---|
| 3,749,125 A | * | 7/1973 | Peruglia | B60T 8/362 251/61.3 |
| 4,355,661 A | * | 10/1982 | Mayer | F16K 31/0655 137/881 |
| 4,518,011 A | | 5/1985 | Stoll | |
| 4,617,960 A | * | 10/1986 | More | E21B 47/26 137/554 |
| 5,039,069 A | * | 8/1991 | Friederichs | B60T 8/367 251/44 |
| 2010/0176323 A1 | * | 7/2010 | Nguyen | F16K 27/0263 137/625 |
| 2017/0108129 A1 | * | 4/2017 | Brenner | F15B 13/0405 |

FOREIGN PATENT DOCUMENTS

| | | |
|---|---|---|
| JP | 60-35982 | 3/1985 |
| JP | S60249705 A | 12/1985 |
| JP | H07259801 A | 10/1995 |
| JP | 2006057719 A | 3/2006 |
| JP | 2007187296 A | 7/2007 |
| JP | 2011127560 A | 6/2011 |
| JP | 5108609 B2 | 10/2012 |

OTHER PUBLICATIONS

International Search Report for PCT/JP2019/005268, dated May 28, 2019, 1 page.
International Search Report for PCT/JP2020/00715, dated Feb. 18, 2020, 2 pages.

* cited by examiner

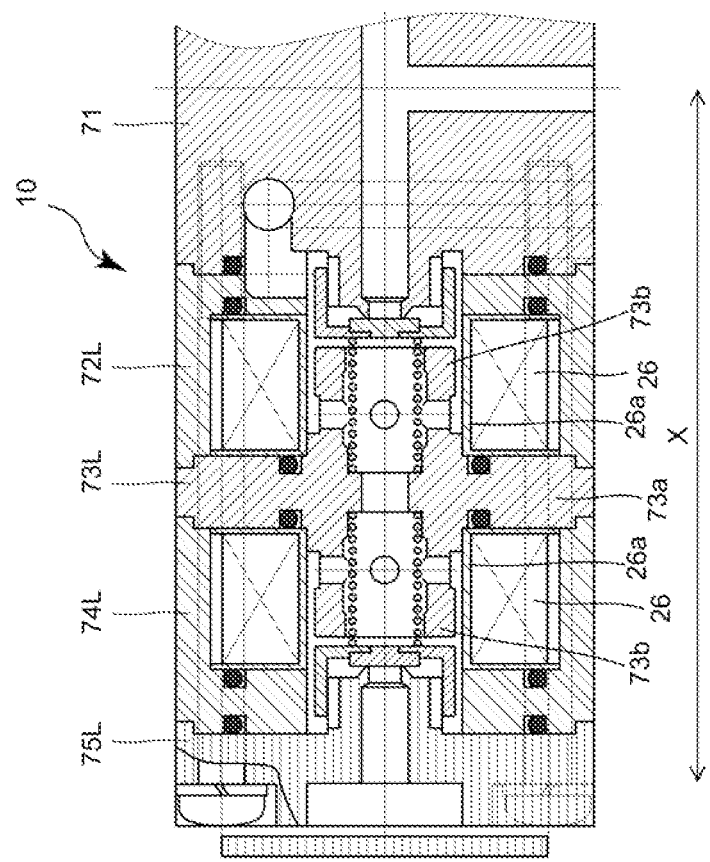
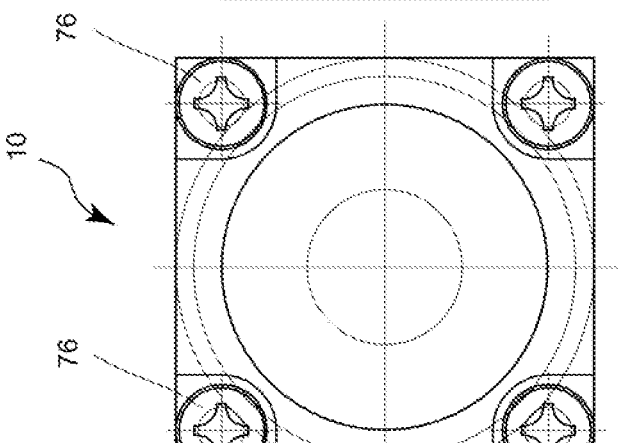
Fig. 8

SERVO VALVE UNIT AND APPARATUS

TECHNICAL FIELD

The present invention relates to a servo valve unit, and more particularly to a servo valve unit for driving a pneumatic cylinder used for a humanoid robot or the like and an apparatus using the same.

BACKGROUND ART

Many large enterprises and capable researchers have been researching robots for at least 50 years, but practical humanoid robots that can actually work on behalf of humans in disaster sites, nursing care sites, homes, etc. have not yet been realized.
Conditions for Realizing a Human Robot
In order to realize a humanoid robot, it is necessary to design a large number of actuators and related parts according to the number of joints with a weight equivalent to that of a human being and to accommodate them in a volume equivalent to that of the human being, and moreover, each actuator is required to have a strong power according to the work.
Actuator Type
There are three types of actuator: electric, hydraulic, and pneumatic. However, for the reasons described below, no actuator satisfying the above-mentioned conditions has been realized in any of the types above.
Electric Servo Motor Control Technology
This is the most advanced control technology and is widely used in industries. Many researchers have also been developing humanoid robots using electric servo motors, and robots that can act closely to human performance by using AI and others have also been developed. On the other hand, there is a problem that the motor and the speed reducer are very heavy and the power per unit volume of the actuator is small. If the power is to be increased, the actuator becomes larger and heavier, and the effects are canceled out. When a large current is applied to a small actuator to generate power, the amount of heat generated increases, resulting in breakage. In order to prevent this, cooling is required, and the weight and volume are eventually increased. Even if only weight and volume problems are considered, it is impossible to realize a humanoid robot using many electric servomotors. In addition, a servo amplifier is required for operation control, and a torque detection and a protection circuit are required to prevent breakage when an overload or a reaction force is applied, resulting in a problem that the structure is complicated.
Hydraulic Servo Control Technology
Like the electric servo motor control technology, this technology is widely used in many industries and is an indispensable technology for manufacturing machine and industrial machines. The greatest advantage is the large power per actuator unit volume. The control equipment is abundant, and the servo technology of the hydraulic pressure is also highly evolved. On the other hand, from the viewpoint of application to a humanoid robot, the greatest drawback is that an oil hydraulic pressure source must be mounted. Since the hydraulic pressure source is driven by a motor or an engine, the weight and volume become very large. A servo amplifier is also required. Therefore, it is very difficult to realize a humanoid robot by a hydraulically driven technology. In addition, oil is poor in compressibility, and there is a possibility that the oil pressure may cause damage to surrounding objects and people due to an overload, or that oil leakage may contaminate the surroundings, making it difficult to use the hydraulically driven technology in human related applications.
Pneumatic Servo Control Technology
Pneumatic cylinders (pneumatic actuators) can have a reduced weight because aluminum can be used as main components, have advantages of large power per unit volume, and are widely used as drive sources in various fields. However, servo control of pneumatic cylinders is a very difficult technique. Although the purpose of the servo is to control the piston position and/or speed, the drive of the pneumatic cylinder is basically accompanied by compressibility and friction, making accurate control difficult compared to the electric and hydraulic systems.

FIG. 7 shows a block diagram of a conventional pneumatic servo control. This block diagram is basically the same for the electric servo and the hydraulic servo. The output signal of the position sensor may be digital or analog. Typically, the command signal will be a digital signal.

The pneumatic servo amplifier generally detects a difference between the command signal and the position sensor information, and controls the pneumatic servo valve on the basis of the digital calculation processing such as PID, which is optimal control. However, currently commonly available pneumatic servo valves are limited to analog types. Presently available pneumatic servo valves mainly employs a spool type servo valve (Patent Document 1) or a flapper type servo valve (Patent Document 2), both of which are of an analog system.

FIG. 8 is a spool type servo valve of Patent Document 1, which includes a sleeve 16 having a supply flow path 40, an exhaust port 42 and a load flow path 44 and a spool 14 having three lands 20, 22, and 24. The spool 14 is driven in the X direction by a solenoid type linear motor 50. When the land 22 is moved in the +X direction from the state in which the land 22 coincides with the load flow path 44, air Pa is supplied from the pneumatic source Ps to the pneumatic cylinder (not shown), when the land 22 is moved in the −X direction, air is exhausted from the pneumatic cylinder, and when the land 22 coincides with the load flow path 44, the supply and exhaust are stopped. The position or speed of the pneumatic cylinder is adjusted by the opening of the load path 44 due to the movement of the land 22.

FIG. 9 is a flapper type servo valve of Patent Document 2, in which the exhaust port 32 is opened and closed by the movement of the flapper 22 in the X direction by the solenoid type linear motor 14, and the position of the movable body 6 is controlled by supplying a back pressure Pa as reduced in accordance with the opening degree of the exhaust port 32 to the pneumatic cylinder 2.

Each of the above servo valves is an analog system in which the valve opening degree is adjusted by controlling the spool 14 or the flapper 22 with a solenoid, and a servo amplifier is indispensable. In addition, since the valve opening degree must be precisely controlled, a very advanced manufacturing techniques and controlling techniques are required. Further, since each of the servo valves needs to be operated while bleeding air in order to reduce friction or the like, the necessary amount of the compressed air becomes large as the number of servo valves increases. These are considered to be the reasons why pneumatic cylinders have hardly been developed in the field of position control where certain degree of accuracy is required, such as a humanoid robot.

The drawbacks of the electric and hydraulic servos described above are fundamental and principally unavoidable irrespective of any effort. Although humanoid robots using electric servo control will continue to be studied in the future due to the ease of precise control and the like, the present inventor believes that even if a huge budget and a large number of human resources are invested, the realization is impossible. In the case of an electric servo, first, the magnetic force is converted into a magnetic force by a coil, and then the motor is rotated by repulsion between magnetic forces. Here, the electric current value itself is a source of the output power. When an electric current flows, heat is generated and a part of the energy becomes thermal energy. Further as the rotational energy at a higher speed rotation is required to be decelerated again, the energy efficiency drops rapidly as the deceleration is performed in order to generate a force. The power is decreased by the heat, and the available energy decreases as the deceleration increases.

If a high-power actuator, which can be called an artificial muscle, is developed, it is considered that there is a new development. Because human muscles are present, equivalents will eventually be able to artificially be developed. However, the present inventors believe that, in the present state in which such an actuator does not exist, the pneumatic servo control system is the only option for realizing a humanoid robot.

Compressed air can be produced by rotating a compressor with an electric motor for a certain period of time. Here, the size and the power of the electric motor and the compressor are not limited. In other words, the compressed air is the energy itself of high density and acts directly for the driving a cylinder. Therefore, it is possible to generate power necessary for the humanoid robot without increasing the volume and weight. The disadvantages of the pneumatic system are as described above, but those are not fundamental. Compressibility is inevitable in pneumatic servos, but cylinder friction is reduced to an extreme, depending on the design. In addition, in a humanoid robot, accurate control such as in machining tools or industrial machines is not necessary, because humans do not perform such accurate movements at all. In conventional pneumatic servo valves, servo amplifiers and extremely sophisticated machining techniques are required because they employ analog systems for controlling air pressure.

PATENT LITERATURE

Patent Literature 1: Japanese Unexamined Patent Application Publication No. 2007-187296
Patent Literature 2: Japanese Unexamined Patent Application Publication No. 2006-057719

SUMMARY OF THE INVENTION

Problems to be Solved by the Invention

Based on the above considerations, the present inventor has diligently made development to realize a servo valve unit that solves all of the drawbacks or at least the serious drawbacks of the above-mentioned pneumatic servo control technology, and completed the present invention.

The present invention provides a servo valve unit capable of controlling the position of a pneumatic cylinder without using a servo amplifier and/or capable of relaxing the demand for machining accuracy and/or not requiring air bleeding. It is an object of the present invention to provide a compact and lightweight servo valve unit capable of driving a pneumatic cylinder with a large power. By achieving these objectives, the conditions described in the above CONDITIONS FOR REALIZING A HUMAN ROBOT can be realized.

Means for Solving the Problem

In a preferable aspect, the servo valve unit for driving a pneumatic actuator of the present application comprises;
a unit body having a first end portion and a second end portion,
a first valve portion,
a second valve portion,
a first seal member that opens and closes the first valve portion,
a second seal member that opens and closes the second valve portion,
a first drive mechanism for driving the first seal member by a first electric pulse,
a second drive mechanism for driving the second seal member by a second electric pulse,
a supply flow path extending between the first end portion and the first valve portion, an exhaust flow path extending between the second end portion and the second valve portion,
a common flow path connected to the supply flow path and the exhaust flow path via the first valve portion and the second valve portion, and
a drive flow path connected to the pneumatic actuator, wherein:
the first drive mechanism and the second drive mechanism are arranged in a drive mechanism arrangement portion located between the first end portion and the second end portion, and wherein:
the drive flow path branches from the common flow path at a branch portion located between the drive mechanism arrangement portion and the first end portion and extends to the first end portion, or
the drive flow path branches from the common flow path at a branch portion located between the drive mechanism arrangement portion and the second end portion and extends to the second end portion.

In a preferred embodiment, the branch portion is located between the drive mechanism arrangement portion and the first end portion, and the supply flow path and the drive flow path extends to the axial direction of the unit body in the first end portion.

In an another preferable aspect, a servo valve unit for driving a pneumatic actuator of the present application comprises a unit body having a plurality of body parts arranged in an axial direction and a fastening member for fastening the body parts in the axial direction, wherein said unit body comprises:
a first valve portion,
a second valve portion,
a first seal member that opens and closes the first valve portion,
a second seal member that opens and closes the second valve portion,
a first drive mechanism for driving the first seal member in the axial direction by a first electric pulse,
a second drive mechanism for driving the second seal member in the axial direction by a second electric pulse,
a supply flow path extending between one end of the unit body and the first valve portion in the axial direction,
an exhaust flow path extending between the other end of the unit body and the second valve portion in the axial direction, a common flow path connected to the supply flow path and the exhaust flow path via the first valve portion and the second valve portion, and a drive flow path connected to the pneumatic actuator.

In a preferred embodiment, in each of the above inventions, the two unit bodies are opposed to each other, the supply flow paths of the two unit bodies are connected to each other, and the supply flow paths and the drive flow paths of the two unit bodies are drawn out from the side surfaces of the unit body.

In a preferred embodiment, in each of the above inventions, the frequencies of the first electric pulse and the second electric pulse are 100 Hz or more.

In a preferred embodiment, in each of the above inventions, the first drive mechanism and the second drive mechanism have a solenoid, and the solenoids of the first drive mechanism and the second drive mechanism are arranged adjacent to each other with a single magnetic plate member interposed therebetween.

There is also disclosed in the present application a apparatus having any of the servo valve unit mentioned above, the pneumatic actuator, and a movable member operated by the pneumatic actuator.

In the above inventions, the position of the pneumatic cylinder can be controlled without using a servo amplifier, and/or the requirement for manufacturing accuracy is relaxed, and/or air bleeding is unnecessary. Additionally or alternatively, it is possible to realize a servo valve unit capable of driving a pneumatic cylinder with a large power and further achieve remarkable miniaturization and/or improvement of durability of the servo valve unit.

BRIEF DESCRIPTION OF THE DRAWINGS

FIG. 8 shows a servo valve unit 2G according to another embodiment.

MODE FOR CARRYING OUT THE INVENTION

Figure 1:
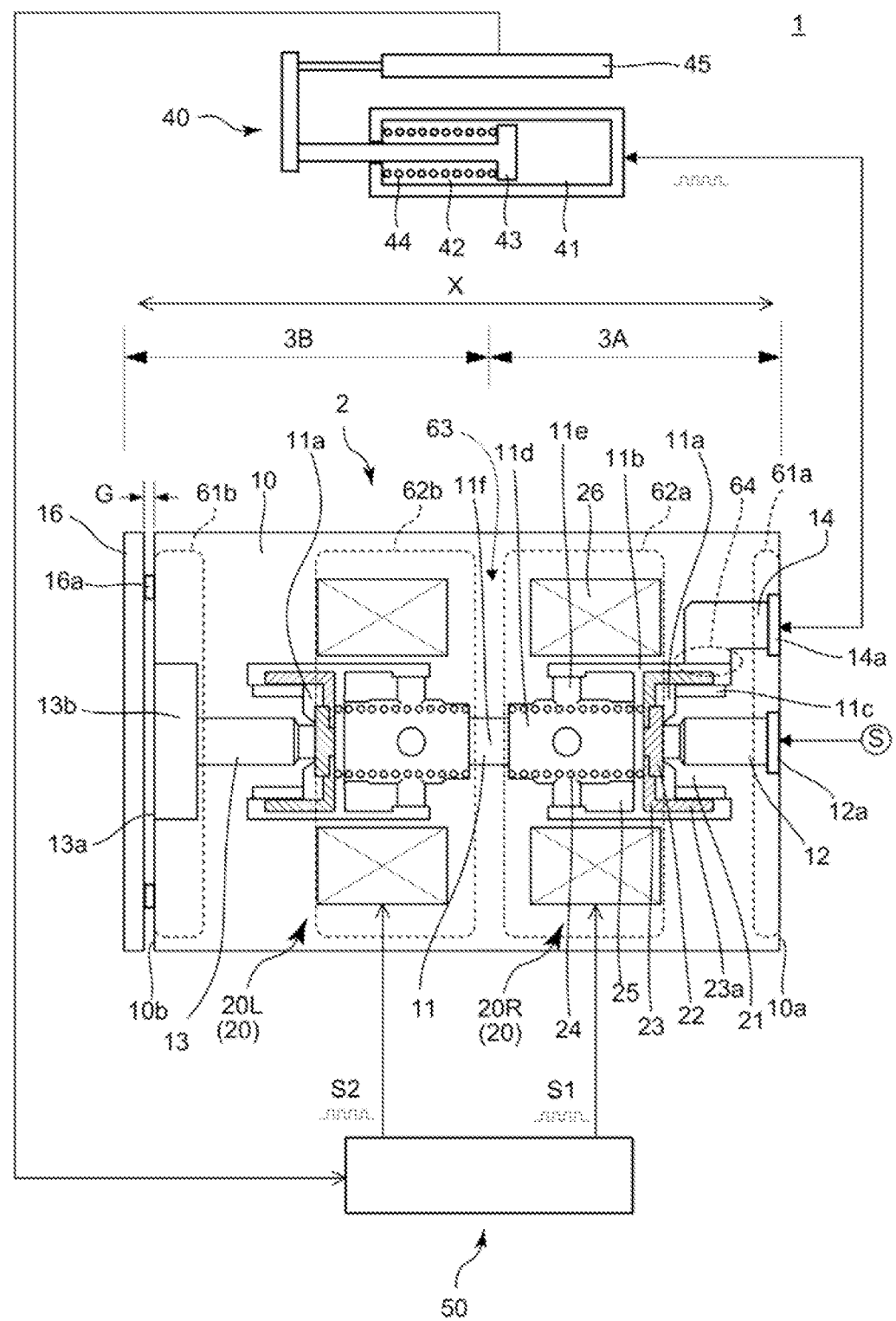
FIG. 1 shows a servo valve unit 2 according to one embodiment of the present invention and a pneumatic control device 1 using the servo valve unit 2.

FIG. 1 shows a servo valve unit 2 and a pneumatic control device 1 using the servo valve unit 2 according to an embodiment of the present invention. The pneumatic control device 1 includes a servo valve unit 2, a pneumatic cylinder 40, and a controller 50. The servo valve unit 2 has a unit body (valve body) 10 in which a hollow spaces such as a common flow path 11, a supply port (supply flow path) 12, an exhaust port (exhaust flow path) 13, and a drive air port (drive air flow path) 14 is formed. The unit body 10 may be an assembly of a plurality of parts made of metal, plastic, or the like.

0001

One end of the supply flow path 12 is connected to the common flow path 11 via a first valve portion 20R capable of a pulsed opening and closing operation in accordance with a first electric pulse S1. The other end may have a connection part 12a, such as a joint, for connection to a source of high pressure air, such as a compressor or cylinder, for supplying high pressure air S. One end of the exhaust flow path 13 is connected to the common flow path 11 via a second valve portion 20L capable of a pulsed opening and closing operation in accordance with a second electric pulse S2. The other end of the exhaust flow path 13 is connected to the outside (e.g., atmospheric pressure) through an opening 13a in the outer wall 10a of the unit body 10. One end of the drive air flow path 14 is constantly connected to the common flow path 11. The other end of the drive air flow path 14 may have a connection 14a, such as a joint, for connection to one of the cylinder chambers 41 of the pneumatic cylinder 40. In the figure, the common flow path 11, the supply flow path 12 and the exhaust flow path 13 extend in the axial direction of the unit body 10, and the drive air flow path 14 is drawn out in the radial direction from a suitable position of the common flow path 11.

The first valve portion 20R and the second valve portion 20L of the present embodiment have the same structure and symmetrical in the axial direction. In the drawings, for simplicity, reference numerals for some members of the second valve portion 20L are omitted. Hereinafter, when it is not necessary to distinguish the first valve portion 20R and the second valve portion 20L, they are simply referred to as the valve portion 20. The valve portion 20 of the present embodiment includes a nozzle (valve member) 21 formed at the tip of the supply flow path 12 and the exhaust flow path 13, a seal member (valve seat) 22 which can close the nozzle 21 by abutting against the tip of the nozzle 21, a magnetic member 23 movable in the axial direction integrally with the seal member 22, a biasing member (urging member) 24 such as a spring for biasing the seal member 22 and the magnetic member 23 in the axial direction, a fixed magnetic core 25 arranged spaced from the nozzle 21 in the axial direction, and a solenoid 26 for exciting the fixed magnetic core 25. It is preferable that the magnetic member 23 has a side wall 23a complementary to the outer shape of the nozzle 21 for guiding the axial movement of the magnetic member 23.

In a state in which the solenoid 26 is not energized, the seal member 22 is in contact with the nozzle 21 by the force of the biasing member 24, so that the valve portion 20 is OFF (closed state), and when the solenoid 26 is energized, the seal member 22 is separated from the nozzle 21 by the magnetic force of the fixed magnetic core 25, and the valve portion 20 is turned ON (open state).

The space between the nozzle space 11a around the seal member 22 of the first valve portion 20R and the nozzle space 11a around the seal member 22 of the second valve portion 20L is always connected by the common flow path 11. That is, the nozzle space 11a and the outer peripheral space 11b around the fixed magnetic core 25 are connected via an axial through groove(s) 11c formed in the side surface of the nozzle 21, and the outer peripheral space 11b and the spring space 11d accommodating the biasing member 24 are connected by a radial through hole 11e. A plurality of the through grooves 11c and the through holes 11e may be formed at intervals in the circumferential direction of the nozzle 21. The spring spaces 11d of the left and right valve portions 20R and 20L are connected to each other by a communication path 11f.

0002

As shown in FIG. 1, the unit body 10 has a first end portion 61a and a second end portion 61b located at both ends of the unit body 10 in the X direction, and a the first drive mechanism arrangement portion 62a and the second drive mechanism arrangement portion 62b located between the first end portion 61a and the second end portion 61b, and an intermediate portion 63 located between the first drive mechanism arrangement portion 62a and the second drive mechanism arrangement portion 62b.

In the present application, the structure, elements, and members (for example, the biasing member 24, the fixed magnetic core 25, and the solenoid 26 of the present embodiment) for driving the seal member 22 are referred to as a "drive mechanism", and the drive mechanism of the first valve portion 20R and the second valve portion 20L are referred to as a "first drive mechanism" and a "second drive mechanism", respectively. The portion of the unit body 10 extending from the first drive mechanism arrangement portion 62a to the second drive mechanism arrangement portion 62b (that is, the portion including the first drive mechanism arrangement portion 62a, the intermediate portion 63, and the second drive mechanism arrangement portion 62b) is referred to as "drive mechanism arrangement portion". In the present embodiment, the first drive mechanism and the second drive mechanism are arranged in the first drive mechanism arrangement portion 62a and the second drive mechanism arrangement portion 62b, respectively. Preferably, the drive mechanism is housed in the spaces formed in the first drive mechanism arrangement portion 62a and the second drive mechanism arrangement portion 62b.

As shown in FIG. 1, the drive air flow path 14 of the servo valve unit 2 branches from the common flow path 11 at a branch point 64 on the midway of the common flow path 11. The branch point 64 is located between the first drive mechanism arrangement portion 62a and the first end portion 61a (or between the first drive mechanism arrangement portion 62a and the tip of the nozzle 21). The drive air flow path 14 of the present embodiment extends from the branch point 64 to the first end surface 10a (or the first end portion 61a).

In the present embodiment, the common flow path 11 extends through the drive mechanism arrangement portion in the X direction. The supply flow path 12 and the drive air flow path 14 extend in parallel to each other in the X direction, and penetrate the first end portion 61a. The exhaust flow path 13 extends through the second end portion 61b in the X direction. The drive air flow path 14 branches from the common flow path 11 at a predetermined position (branch point 64) in the midway of the common flow path 11, and extends from the branch point 64 to the first end portion 61a (or the first end surface 10a). The branch point 64 is preferably located between the first end portion 61a (or the first end surface 10a) and the first drive mechanism arrangement portion 62a. Additionally or alternatively, the branch point 64 is preferably located between the tip of the nozzle 21 of the first valve portion 20R and the first drive mechanism arrangement portion 62a on route of the common flow path 11.

In another embodiment, the branch point 64 is located between the second end portion 61b (or the second end surface 10b) and the second drive mechanism arrangement portion 62b, or between the tip of the nozzle 21 of the second valve portion 20L and the second drive mechanism arrangement portion 62b on the route of the common flow path 11. In this case, the drive air flow path 14 preferably extends from the branch point 64 to the second end portion 61b (or to the second end surface 10b), and the exhaust flow path 13 and the drive air flow path 14 extend in parallel to each other in the X direction in the second end portion 61b.

The position of the branch point 64, the arrangement of the drive air flow path 14, and the extension direction of the supply flow path 12 and the drive air flow path 14 at the first end portion 61a can be the same in the servo valve units 2A to 2H described later.

Hereinafter, the left half and the right half of the servo valve unit 2 are sometimes referred to as servo valve elements 3A and 3B.

The pneumatic cylinder 40 has cylinder chambers 41 and 42, a piston 43 and a biasing means 44 such as a spring for biasing the piston 43. The axial position of the piston 43 can be detected by a position sensor 45. The shapes of the cylinder chambers 41 and 42 are arbitrary, and the cross section of the cylinder chambers 41 and 42 may have a shape other than circle. The controller 50 generates first and second electric pulses S1 and S2. The first and second electric pulses S1 and S2 may be signals depending on the position of the piston 43, the desired speed, etc. The first and second electric pulses S1 and S2 may have a duty ratio that depends on the position or speed of the piston 43. The controller 50 may be, for example, a computer.

When the electric pulse S1 is turned ON and the electric pulse S2 is turned OFF, the first valve portion 20R is turned ON and the second valve portion 20L is turned OFF, so that the high-pressure air S is supplied from the supply flow path 12 to the cylinder chamber 41 via the common flow path 11 and the drive air flow path 14, and the piston 43 can be moved leftward. When the electric pulse S1 is turned OFF and the electric pulse S2 is turned ON, the first valve portion 20R is turned OFF and the second valve portion 20L is turned ON, the air in the cylinder chamber 41 is discharged to the outside from the opening 13a through the drive air flow path 14, the common flow path 11, and the exhaust flow path 13, and the piston 43 is moved rightward by the force of the biasing means 44. When both of the electric pulses S1 and S2 are turned OFF, the supply and exhaust to and from the cylinder chamber 41 are stopped.

In this manner, the supply and exhaust of the cylinder chamber 41 can be performed in a pulsed manner by opening and closing the valve portions 20R and 20L in a pulsed manner by the control of the electric pulses S1 and S2. Precise and smooth position control of the piston 43 can be achieved by speeding up the switching of the supply and exhaust (switching of the supply/stop or switching of the exhaust/stop). Basically, when the duty ratio of the electric pulse S1 or S2 is increased, the driving force of the piston 43 is increased, and when the duty ratio is decreased, the driving force of the piston 43 is decreased. Therefore, when the difference Δd between the current position and the target position of the piston 43 is large, the duty ratio is increased to move the piston 43 at high speed, and when the difference Δd becomes small, the duty ratio is decreased to decelerate the piston 43, and the piston 43 can be stopped by setting the duty ratio Δd to zero (signal stop). However, in order to perform a rapid positioning or follow-up control, it is preferable to perform control such that the movement is started at a slow speed, gradually accelerated, and then decelerated, and stopped. In addition, it is preferable to control to freely change the speed in accordance with the kind of the task of the robot or the like. For these controls, it is preferable to heighten the speed of the supply/exhaust switching, and it is desirable that the maximum frequency of the supply/exhaust switching be 100 Hz or more, preferably 300 Hz or more, more preferably 500 Hz or more, and particularly preferably 1000 Hz or more. In the servo valve unit 2 of the present embodiment, high-speed switching of 300 to 500 Hz is realized in a prototype stage, and it has been confirmed that a motion close to a human can be realized in a prototype of an arm unit of a humanoid robot incorporating a pneumatic cylinder driven by the servo valve unit 2. The inventors of the present application believe that 1000 Hz can be achieved by future improvements.

In the servo valve unit 2, it is not necessary to provide the branch point 64 or the drive air flow path 14 in the drive mechanism arrangement portion. The drive mechanism arrangement portion (particularly, the intermediate portion 63) has a complicated structure due to the shape of the drive mechanism, wire routing for the drive mechanism, etc. Therefore, by not providing the branch point 64 and the drive air flow path 14 in such a complicated portion, the drive mechanism arrangement portions can be easily fabricated or assembled, and the dimension of the intermediate portion 63 (particularly the dimension in the X direction) can be reduced. As a result, the entire servo valve unit 2 can be miniaturized. Further, since the supply flow path 12 and the drive air flow path 14 (or the exhaust flow path 13 and the drive air flow path 14) are parallel to each other, forming of the first end portion 61*a* (or the second end portion 61*b*) becomes easy. In the servo valve units 2A to 2H described later, by arranging the position of the branch point 64, the arrangement of the drive air flow path 14, the extending direction of the supply flow path 12 and the drive air flow path 14 at the first end 61*a*, etc., in the same manner in this embodiment, the same effect as in the servo valve unit 2 can be achieved.

The servo valve unit 2 may further include a silencer plate 16 for reducing exhaust noise. The silencer plate 16 is attached to the unit body 10 at a position overlapping with the opening 13*a*, i.e., at a position blocking the opening 13*a*, with a gap G from the outer wall 10*a*. The silencer plate 16 preferably has a sufficiently larger area than the opening 13*a* and is parallel to the outer wall 10*a*. The exhaust flow path 13 may have a cavity portion 13*b* having a large cross-sectional area on the opening 13*a* side. Since the air exhausted gradually expands from the nozzle 21 to the outer periphery of the gap G through the cavity portion 13*b*, it is possible to effectively alleviate the burst sound at the time of exhaustion to the atmosphere. When the circumferential length of the cavity portion 13*b* is L, the gap is G, and the opening area of the nozzles 21 is SA1, it is desirable that L×G is approximately equal to SA1. The cross-sectional area of the exhaust flow path 13 from the nozzle 21 toward the opening 13*a* may be increased in multiple stages or gradually. If the gap G is increased or decreased in accordance with the exhaust pressure by fixing the silencing plate 16 with the elastic body 16*a* having a spring property or the like, the exhaust pressure is further leveled to improve the silencing effect. Although the above arrangement is not 100% muffling, a significant muffling effect can be achieved while achieving the space saving which is an important object of the present invention.

Figure 2:
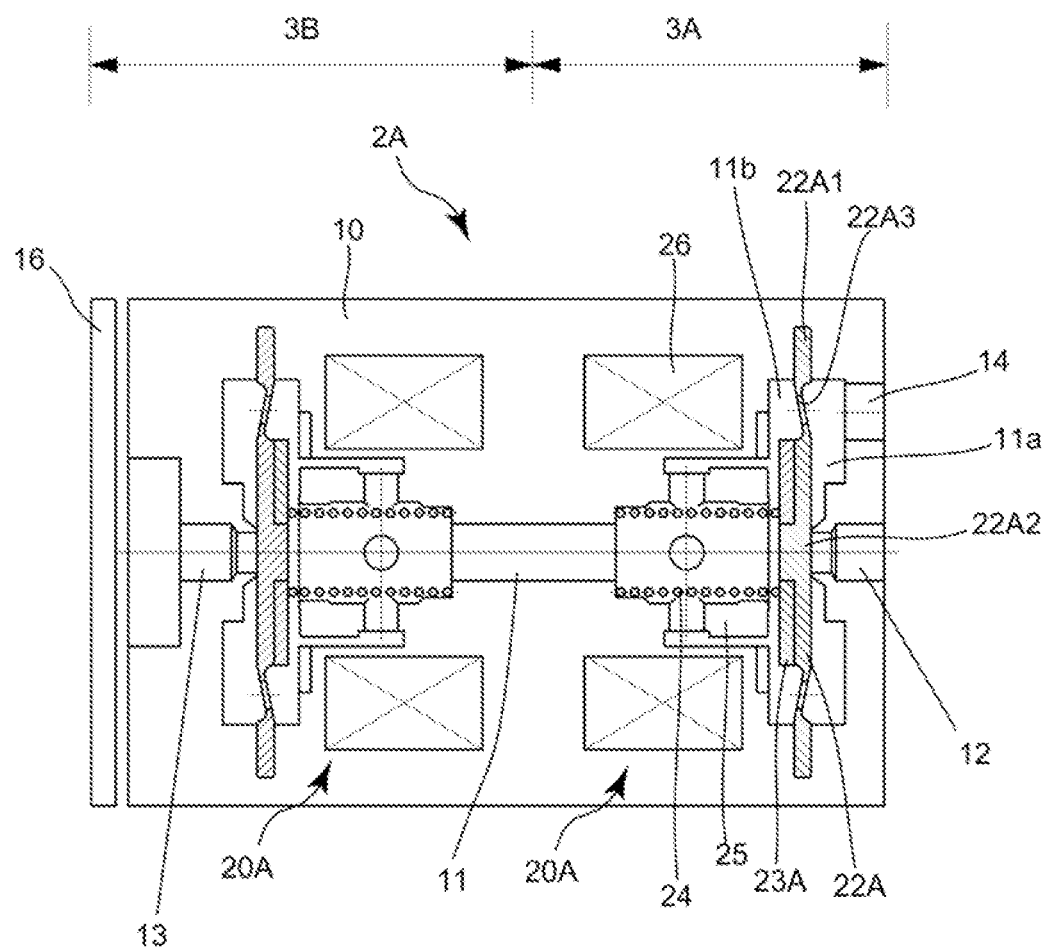
FIG. 2 shows a servo valve unit 2A according to another embodiment.

FIG. 2 shows a servo valve unit 2A of another embodiment, in which the same members as those of the servo valve unit 2 are denoted by the same reference numerals, or in which some reference numerals are omitted for the sake of simplicity. The servo valve unit 2A may have the same configuration as the servo valve unit 2 except for the left and right valve portions 20A. Each of the valve portions 20A may have the same structure symmetrical with respect to the left and right.

In the valve portion 20A, a disk-shaped elastic member 22A and a magnetic member 23A are used instead of the seal member 22 and the magnetic member 23 of the valve portion 20. The disk-shaped elastic member 22A has an outer peripheral portion 22A1 fixed to the unit body 10, and a central portion which constitutes a seal member 22A2 capable of closing the nozzle 21, and a plurality of openings 22A3 are formed in the middle of the seal member 22A2. The opening 22A3 communicates the nozzle space 11*a* with the outer peripheral space 11*b*. The disk-shaped elastic member 22A can be formed of the same material as that of the diaphragm. The magnetic member 23A is formed integrally with the disk-shaped elastic member 22A.

In a state where the solenoid 26 is not energized, the seal member 22A2 comes into contact with the nozzle 21 by the force of the biasing member 24 and the valve portion 20A is turned off, and when the solenoid 26 is energized, the seal member 22A2 is separated from the nozzle 21 by the magnetic force of the fixed magnetic core 25 and the valve portion 20A is turned on. The valve portion 20A can open and close the nozzle 21 reliably and at high speed similarly to the valve portion 20. Since the outer peripheral portion 22A1 is fixed to the unit body 10, the movement of the seal member 22A2 can be limited in the axial direction.

Also in the servo valve unit 2A, the same high-speed opening and closing operation as in the servo valve unit 2 can be performed, and furthermore, the durability of the valve portion 20A can be expected to be improved by the use of the disk-shaped elastic member 22A.

Figure 3:
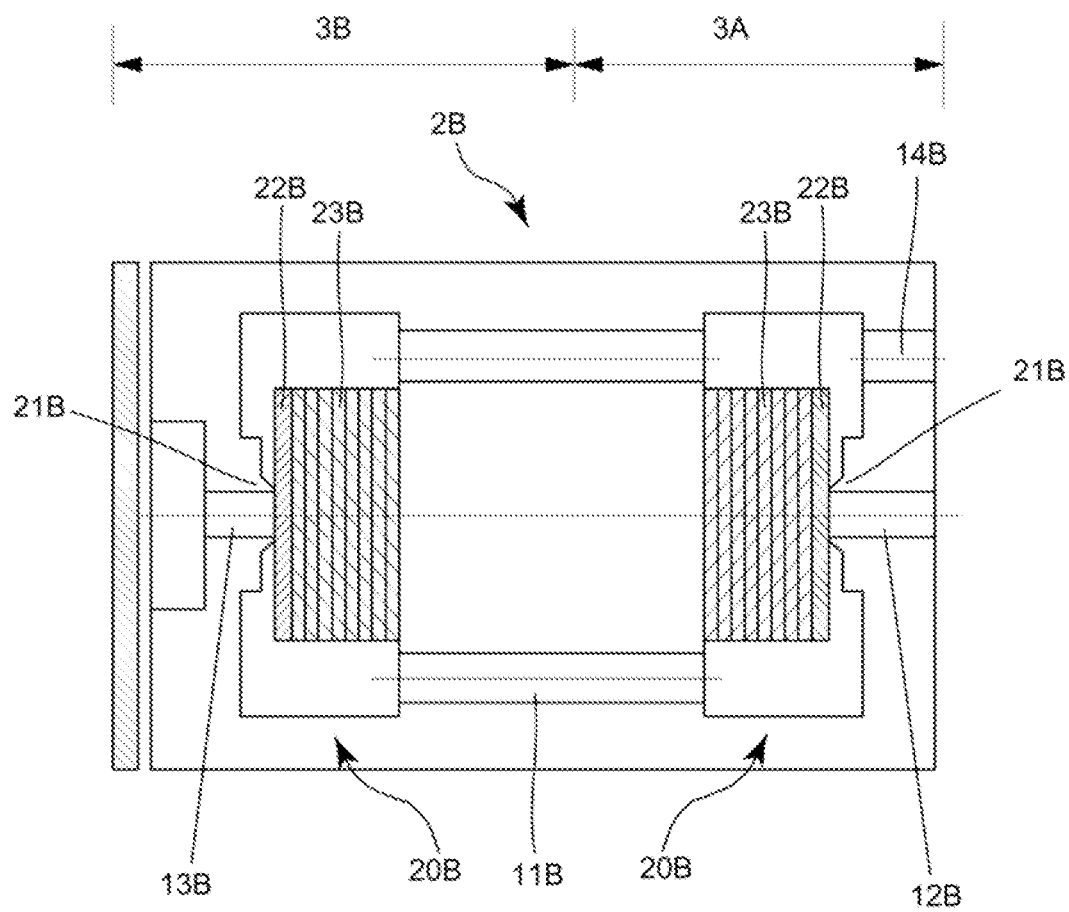
FIG. 3 shows a servo valve unit 2B according to another embodiment.

FIG. 3 shows a servo valve unit 2B of another embodiment. The servo valve unit 2B has a common flow path 11B, a supply flow path 12B, an exhaust flow path 13B, a drive air flow path 14B, and two symmetrical valve portions 20B. Each valve portion 20B has a nozzle 21B at the tip of the common flow path 11B and the exhaust flow path 13B, a seal member 22B, and an expansion and contraction member 23B.

The expansion and contraction member 23B is a material that expands and contracts by an applied voltage or the like. The expansion and contraction member 23B may be formed of a piezoelectric element or a conductive resin. The expansion and contraction member 23B may use a single piece of expansion/contraction material having a fixed dimension in the axial direction, but by stacking a plurality of expansion/contraction materials, the amount of expansion/contraction can be increased.

When expansion and contraction member 23B expands, the seal member 22B abuts against the nozzle 21B to turn off the valve portion 20B, and when expansion and contraction member 23B contracts, the seal member 22B separates from the nozzle 21B to turn on the valve portion 20B. Also in the servo valve unit 2B, the same high-speed opening and closing operation as in the servo valve unit 2 can be achieved.

Figure 4:
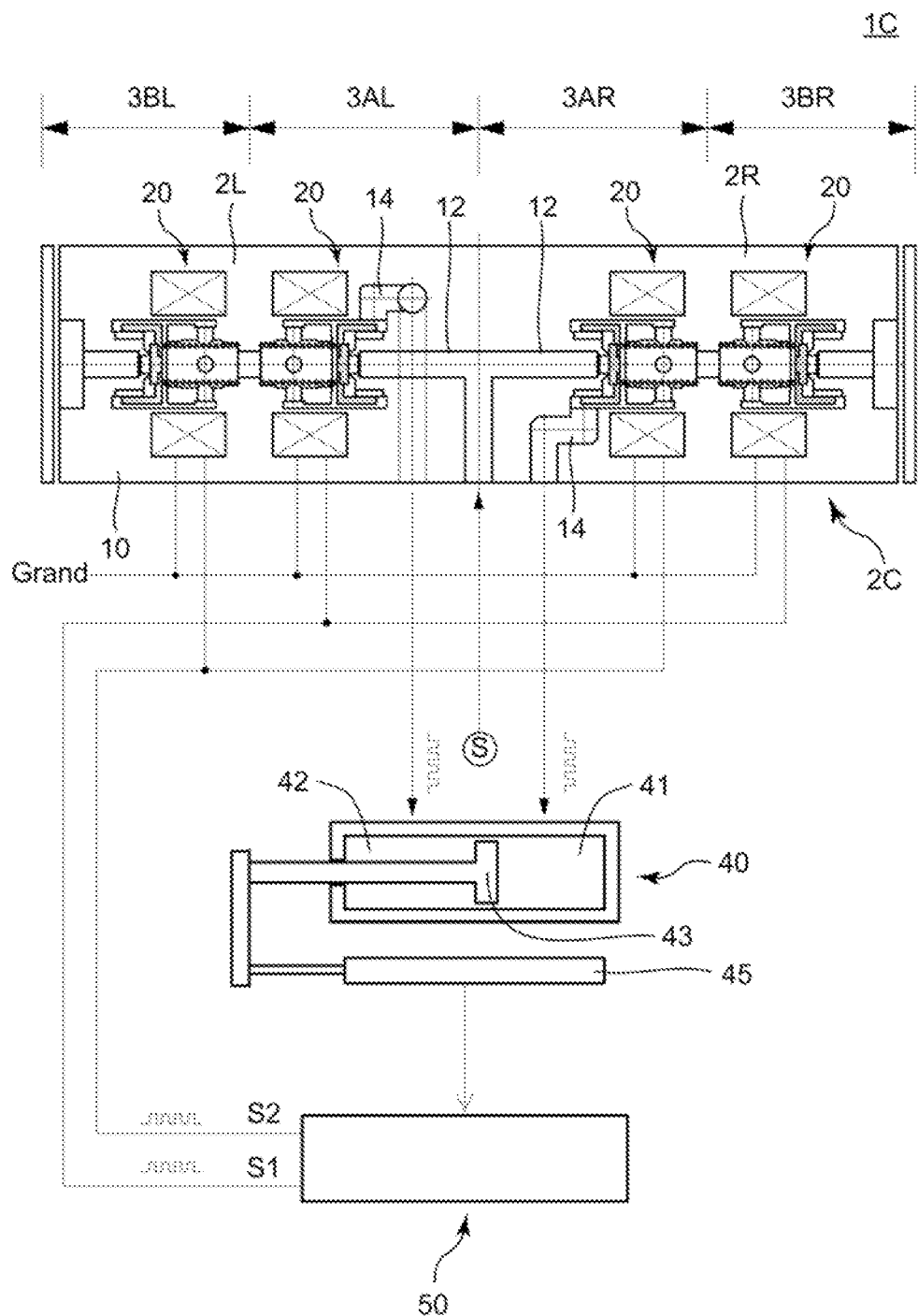
FIG. 4 shows a servo valve unit 2C according to another embodiment and a pneumatic control device 1C using the servo valve unit 2C.

FIG. 4 shows a servo valve unit 2C according to another embodiment and a pneumatic control device 1C using the servo valve unit. The servo valve unit 2C has a configuration in which two servo valve units 2R and 2L are housed in a single unit body 10 such that the supply ports (supply flow path) 12 face each other, and the servo valve unit composes four servo valve elements 3AL, 3AR, 3BL and 3BR. The servo valve unit 2R and 2L has a configuration similar to that of the servo valve unit 2, but the two supply flow path 12 are connected in the center and drawn out from the side surface of the unit body 10. The drive air flow paths 14 are drawn out from the side surface of the unit body 10 and connected to the respective cylinder chambers of the pneumatic cylinder 40. Connection parts 12a and 14a of the supply flow path 12 and the drive air flow path 14 are preferably provided on the same side and/or adjacent to the unit body 10.

The controller 50 applies electric pulses S1 and S2 to the right and left servo valve units 2R and 2L in accordance with the piston position of the pneumatic cylinder 40, the desired piston velocity, and the like. In this embodiment, an electric pulse S1 is applied to the servo valve elements 3AL and 3BR, and an electric pulse S2 is applied to the servo valve elements 3BL and 3AR. As a result, the servo valve unit 2R and 2L operates in the same manner as the servo valve unit 2 to drive the pistons 43 to the left and right. In the wiring shown in the figure, the servo valve element 3AL and the servo valve element 3BR are excited at the same time and the servo valve element 3BL and the servo valve element 3AR are excited at the same time, but they may be excited independently. The number of pulses of each electric pulse to the servo valve elements 3AL, 3AR, 3BL and 3BR may be changed.

Figure 5:
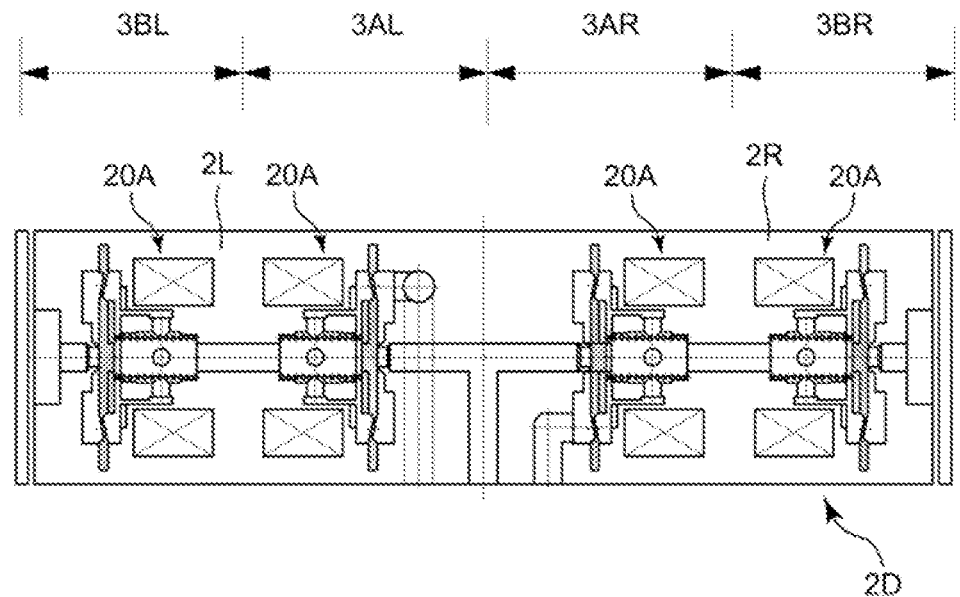
FIG. 5 shows a servo valve unit 2D according to another embodiment.
Figure 6:
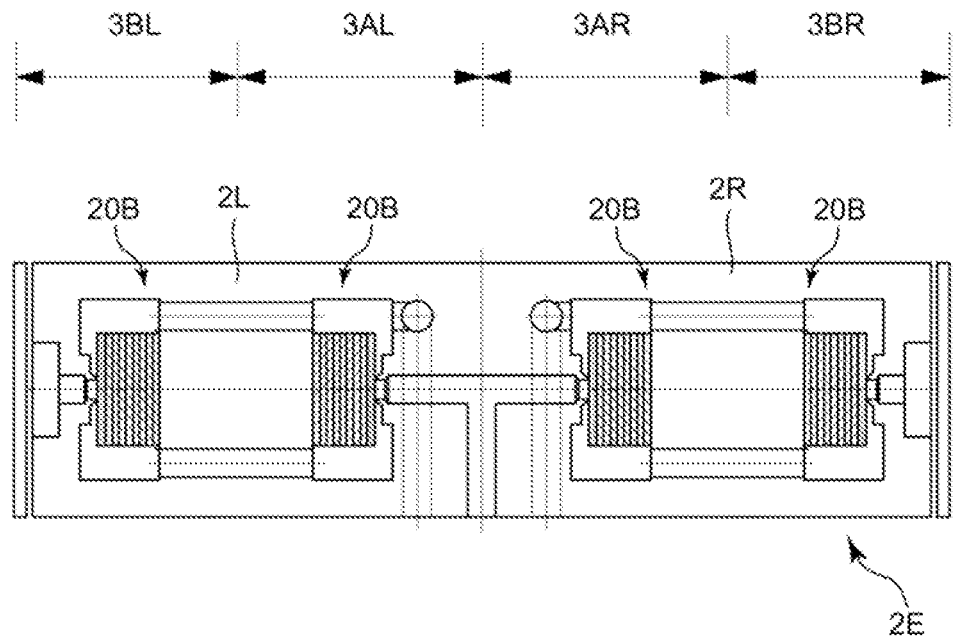
FIG. 6 shows a servo valve unit 2E according to another embodiment.

The servo valve unit 2C shown in FIG. 4 has a valve portion 20 similar to the servo valve unit 2, but a servo valve unit 2D and 2E shown in FIGS. 5 and 6 in which the valve portion 20 is changed to the valve portion 20A or 20B can also be used. One of the valve portions 20A to 20C may be used in one of the servo valve units 2R and 2L, and the other of the valve portions 20A to 20C may be used in the other servo valve unit. Other embodiments of the valve portion may be used as long as it can be opened and closed at high speed.

Figure 7:
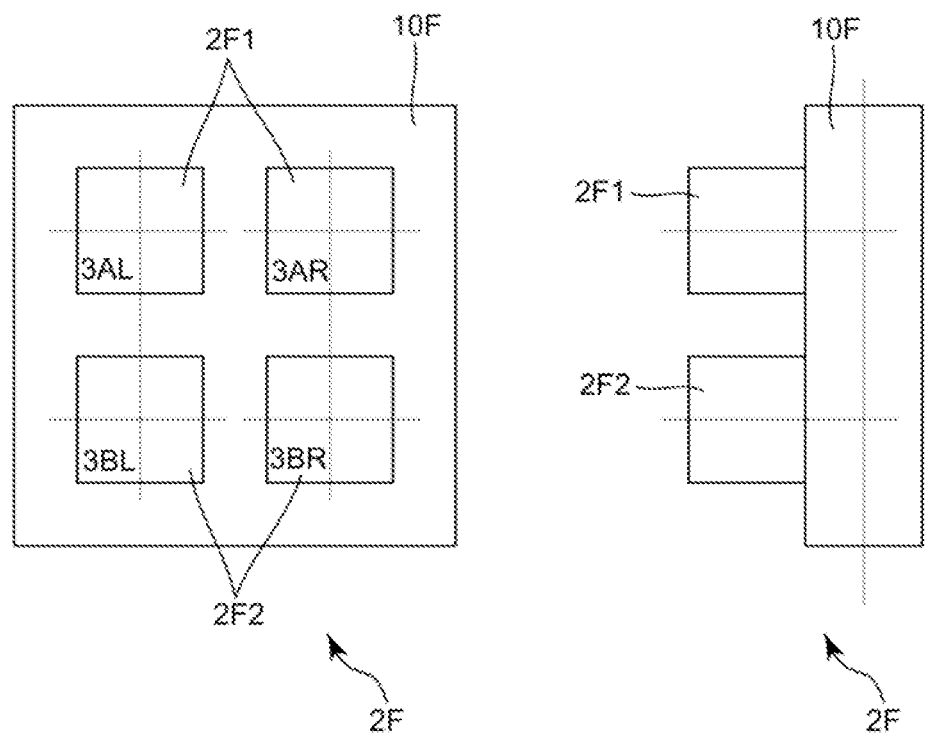
FIG. 7 shows a servo valve unit 2F according to another embodiment.

FIG. 7 shows a servo valve unit 2F of yet another embodiment. In the servo valve unit 2F, two servo valve units 2F1 and 2F2 are arranged on one surface of a plate-shaped unit body 10F. The arrangement of the servo valve elements 3AL, 3AR, 3BL and 3BR is exemplary, and other arrangements are also feasible. The servo valve unit 2F1 may be disposed on one surface, the servo valve unit 2F2 may be disposed on the other surface, the servo valve element 3AL, 3AR may be disposed on one surface, and the servo valve element 3BL, 3BR may be disposed on the other surface. The communication between each of the flow paths may be performed in accordance with each of the above-described embodiments.

In the servo valve units 2, 2A to 2F, since the extension directions of the common flow path 11, the supply flow path 12, the exhaust flow path 13, and the drive air flow path 14 are all in the X direction, the directions of the loads generated inside the servo valve units 2, 2A to 2F are mostly in the X direction. Therefore, the durability and failure resistance of the servo valve units 2, 2A to 2F can be improved only by increasing the strength (load resistance and impact resistance) in the X direction. The above effect is remarkable when the unit body 10 is composed of a plurality of body parts. For example, the above effect is particularly remarkable when:

1. the common flow path 11, the supply flow path 12, the exhaust flow path 13 and/or the drive air flow path 14 extends over a plurality of body parts,
2. the ends of the common flow path 11, the supply flow path 12, the exhaust flow path 13 and/or the drive air flow path 14 are located at the boundary of adjacent body parts or
3. a force acts between adjacent body parts due to the biasing member 24, the sealing member 26, etc.

Figure 9:
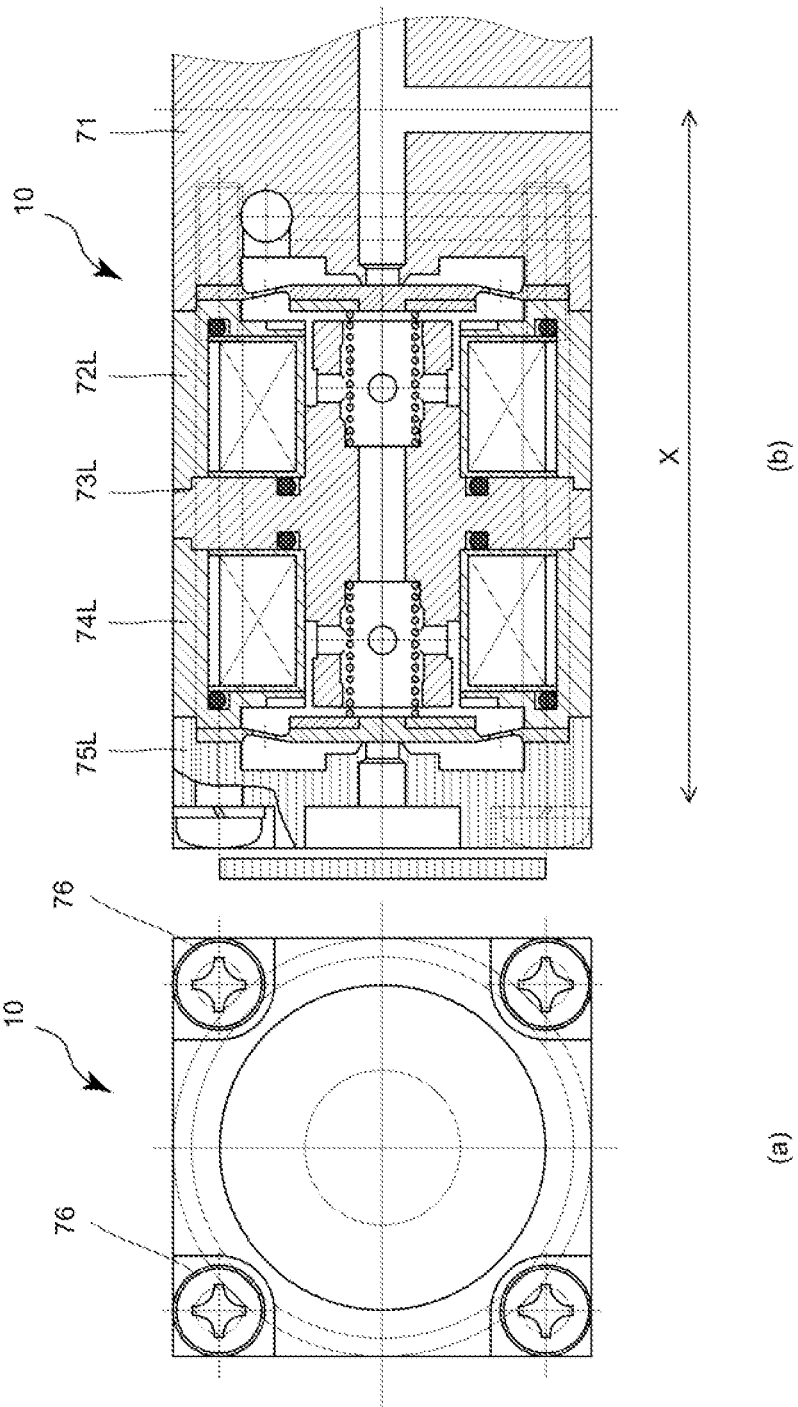
FIG. 9 shows a servo valve unit 2H according to another embodiment.

FIGS. 8 and 9 show servo valve units 2G and 2H in which the unit body 10 is composed of a plurality of body parts. (a) is a front view and (b) is a side sectional view. The servo valve units 2G and 2H have the same configuration as those in the servo valve units 2C and 2D except that the unit body of the servo valve units 2G and 2H comprises a plurality (nine in the figure) of body parts 71, 72L, 72R, 73L, 73R, 74L, 74R, 75L and 75R and each of the body parts are tightened in the X direction by a fastener 76 such as bolts or the like. Since the servo valve units 2G and 2H are symmetrical, only the left half of the servo valve units 2G and 2H is shown in FIGS. 8(a) and 9(a), and a part of the right side of the body part 71 and the body parts 72R, 73R, 74R, 75R at the right side of the unit body 10 are not shown. Hereinafter, when it is not necessary to distinguish between the left half and right half, the body parts are described as 71, 72, 73, 74, 75 and the like.

In the servo valve units 2G and 2H, since the unit body 10 is divided into a plurality of body parts, the shape of each body part is simplified to facilitate manufacturing. Then, by tightening the fastener 76 in the X direction, vibration between the unit parts during operation can be suppressed, and durability and failure resistance can be improved.

Figure 10:
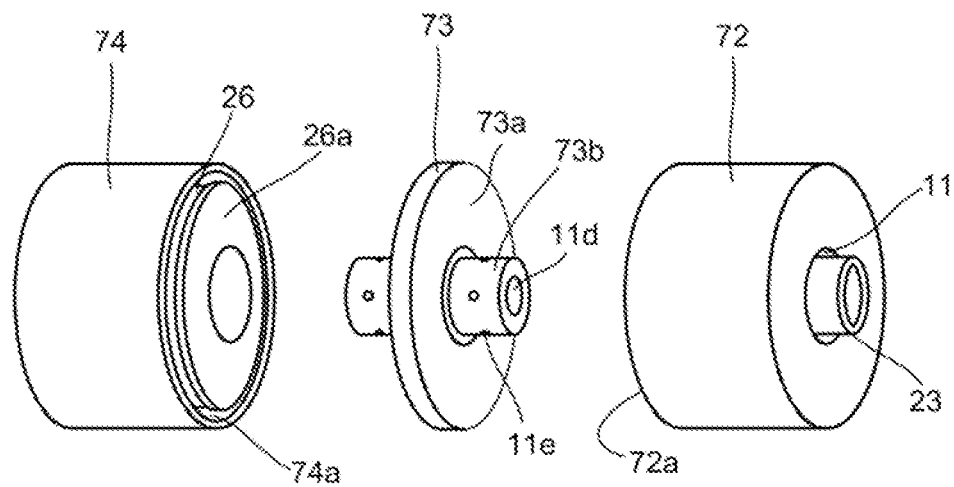
FIG. 10 shows exemplary body parts 72-74.
Figure 11:
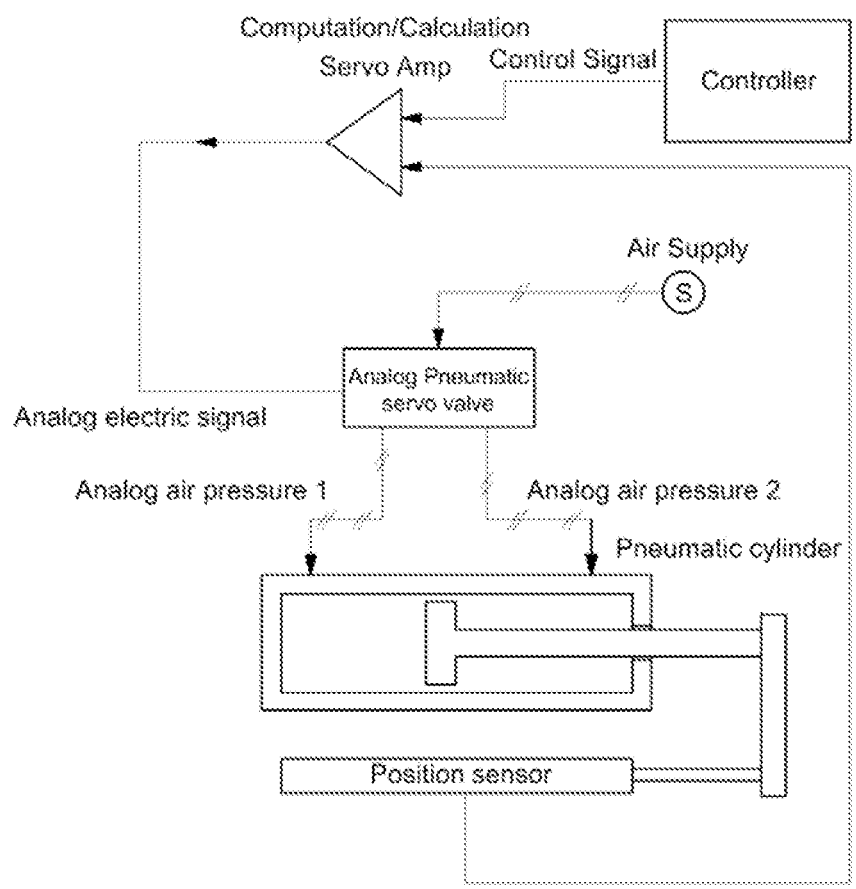
FIG. 11 shows a block diagram of a conventional pneumatic servo control.
Figure 12:
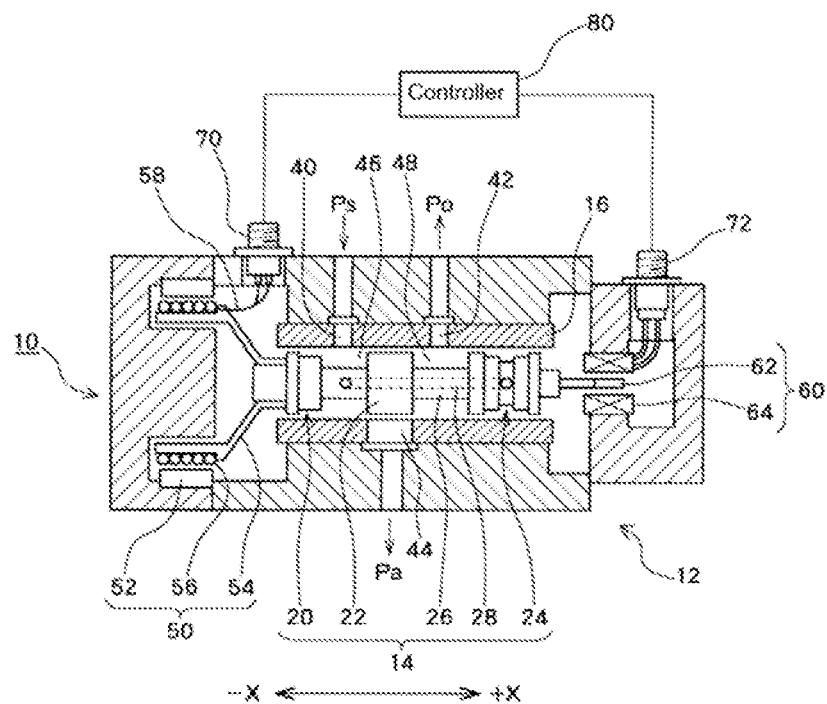
FIG. 12 shows a conventional spool type servo valve.
Figure 13:
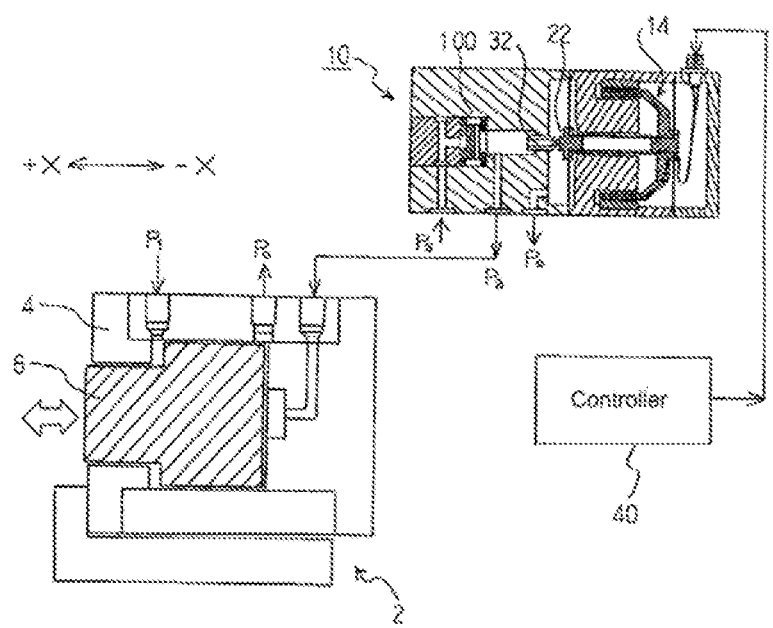
FIG. 13 shows a conventional flapper type servo valve.

As shown in FIG. 10, the body parts 72 and 74 may be a tubular bobbin case each of which houses the solenoid 26 wound around a bobbin 26a. The body parts 72 and 74 may have openings 72a and 74a on the body part 73 side. The body part 73 may have a magnetic wall portion 73a that closes the openings 72a and 74a, and a rod portion 73b in which the spring space 11d and the through holes 11e are formed. The body parts 72 to 74 may be made of a magnetic material. By surrounding the solenoid 26 with a magnetic material (body part 72 (74), magnetic wall portion 73a, rod portion 73b, and magnetic member 23), the driving force of the magnetic member 23 can be increased. In the servo valve units 2G and 2H, since the two solenoids 26 are arranged adjacent to each other with placing a single magnetic wall portion 73a between them, further advantages such as miniaturization, decrease of the number of parts, easy assembly, and the like can be achieved.

In FIGS. 8 to 10, an example in which the unit body 10 is composed of a plurality of body parts is shown. Likewise, in the servo valve units 2, 2A, 2B, 2E and 2F, the unit body 10 can also be composed of a plurality of body parts and tightened in the X direction with a fastener to achieve the same effect as the servo valve units 2G and 2H. In the servo valve unit of the above embodiment, the pneumatic cylinder can be controlled with high accuracy without using a servo amplifier, and the machining accuracy as in the conventional pneumatic servo valve is unnecessary, and bleeding of air is unnecessary. In particular, by setting the switching speed of the ON/OFF of the valve portion or the switching speed of the supply/exhaust to/from the pneumatic cylinder to 100 Hz or more, the moving speed and the stopping position of the pistons 43 can be smoothly controlled. By setting the switching speed to 300 Hz or more, more preferably 500 Hz or more, more preferably 1000 Hz or more, the controllability of the piston moving speed and the stopping position can be further enhanced. It should be noted that as each cylinder chamber and flow paths has a certain volume, and the piston has a moment of inertia and a slight friction, the piston operates smoothly without any trouble even if switching between supply and exhaust in a pulsed manner is performed.

Among the above embodiments, prototypes of the servo valve units 2D and 2E with a small size of 20×25×70 mm were actually produced, and it was confirmed that stable operation at switching speeds of up to 300 Hz to 500 Hz and smooth high-precision control of pneumatic cylinders with diameters 30 mmΦ to 80 mmΦ (stroke length of 50 mm) could be realized. In addition, an arm unit of a human-sized humanoid robot which performs multi-joint driving by using 8 prototype servo valve units as above and 8 pneumatic cylinders was actually produced, and it was confirmed that it was possible to freely raise and lower the arm unit to which a weight of 12.5 kg is attached at the tip part (palm part). Actual operations were videotaped and uploaded in the youtube (URL: https://youtu.be/mAEVIudfmno, https://youtu.be/7cVjNuoC_w8, https://youtu.be/FxbWDolcv_k, https://youtu.be/5XO8cX9oREA, https://youtu.be/0qnxH6PFCwo)). In this arm unit, all of the eight servo valve units are accommodated in the upper arm portion.

The signal of the position sensor may be digital or analog. However, it is better to perform AD conversion in a controller using a micro-size analog sensor for the realization of miniaturization and higher resolution to some extent, whereby the space can be made small and the number of wirings can be reduced, This is effective in designing a complicated articulated robot.

0003

Since the motive for the development of the present invention is a humanoid robot (humanoid disaster robot), the present invention has been mainly described as being applied to a humanoid robot, but the present invention is also applicable to various robots other than the humanoid robot (for example, a lizard type, a centipede type, a multi-legged robot, a four-legged animal robot, or the like). The present invention can be applied to robots other than disaster robots, such as nursing care robots and work assisting robots. Since the air pressure is compressible, the air pressure can flexibly cope with the reaction force, and therefore, contact actions of the robot or the like can be made gentle to a person. Furthermore, the present invention is applicable to fields other than robots and is widely applicable to driving of a movable member in an industrial machines or household appliances.

The dimensions, shapes, arrangements, numbers, materials, characteristics, and the like of the servo valve unit or the pneumatic control device described in the above embodiments or the elements constituting the servo valve unit or the pneumatic control device are examples, and these can be appropriately changed within the scope and essence of the invention described in the claims.

The invention claimed is:

1. A servo valve unit for driving a pneumatic actuator, comprising;
   a unit body extending in a longitudinal direction, said unit body having a first end portion and a second end portion located at the both ends of the unit body in the longitudinal direction,
   a first valve portion,
   a second valve portion,
   a first seal member that opens and closes the first valve portion,
   a second seal member that opens and closes the second valve portion,
   a first drive mechanism for driving the first seal member by a first electric pulse,
   a second drive mechanism for driving the second seal member by a second electric pulse,
   a supply flow path extending between the first end portion and the first valve portion,
   an exhaust flow path extending between the second end portion and the second valve portion,
   a common flow path connected to the supply flow path and the exhaust flow path via the first valve portion and the second valve portion, and
   a drive flow path connected to the pneumatic actuator, wherein:
   the first drive mechanism and the second drive mechanism are arranged in a drive mechanism arrangement portion located at a place separated from and between the first end portion and the second end portion in the longitudinal direction, and wherein:
      the drive flow path branches from the common flow path at a branch portion located at a place separated from and between the drive mechanism arrangement portion and the first end portion in the longitudinal direction and extends to the first end portion, or
      the drive flow path branches from the common flow path at a branch portion located at a place separated from and between the drive mechanism arrangement portion and the second end portion in the longitudinal direction and extends to the second end portion.

2. A servo valve unit according to claim 1, wherein the branch portion is located between the drive mechanism arrangement portion and the first end portion, and the supply flow path and the drive flow path extends to an axial direction of the unit body in the first end portion.

3. A servo valve unit having at least first and second unit bodies, each of the first and second unit bodies according to claim 2, wherein the first and second unit bodies are opposed to each other to form a single unit body, the supply flow paths of the first and second unit bodies are connected to each other to be drawn out from a surface of the single unit body, and the drive flow paths of the first and second unit bodies are drawn out from a side surface of each of the first and second unit bodies, respectively.

4. A servo valve unit according to claim 2, wherein the frequencies of the first electric pulse and the second electric pulse are 100 Hz or more.

5. A servo valve unit according to claim 2, wherein each of the first drive mechanism and the second drive mechanism have a solenoid, and the solenoids of the first drive mechanism and the second drive mechanism are arranged adjacent to each other with a single magnetic plate member interposed therebetween.

6. An apparatus comprising;
   a servo valve unit according to claim 1,
   the pneumatic actuator, and
   a movable member operated by the pneumatic actuator.

7. An apparatus of claim 6, wherein the unit body of the servo valve unit is constituted by a plurality of body parts arranged in an axial direction, and further comprises a fastening member for fastening the plurality of body parts in the axial direction.

8. An apparatus having at least first and second unit bodies, each of the first and second unit bodies according to claim 6, wherein the first and second unit bodies are opposed to each other to form a single unit body, the supply flow paths of the first and second unit bodies are connected to each other to be drawn out from a surface of the single unit body, and each of the drive flow paths of the first and second unit bodies are drawn out from a side surface of each of the first and second unit bodies, respectively.

9. An apparatus of claim 6, wherein the frequencies of the first electric pulse and the second electric pulse are 100 Hz or more.

10. An apparatus of claim 6, wherein each of the first drive mechanism and the second drive mechanism have a solenoid, and the solenoids of the first drive mechanism and the second drive mechanism are arranged adjacent to each other with a single magnetic plate member interposed therebetween.

11. A servo valve unit having at least first and second unit bodies, each of the first and second unit bodies according to claim 1, the first unit body and the second unit body are opposed to each other to form a single unit body, the supply flow paths of the first and second unit bodies are connected to each other to be drawn out from a side surface of the single unit body, and the drive flow paths of the first and second unit bodies are drawn out from a side surfaces of each of the first and second unit bodies, respectively.

12. A servo valve unit according to claim 1, wherein the frequencies of the first electric pulse and the second electric pulse are 100 Hz or more.

13. A servo valve unit according to claim 1, wherein each of the first drive mechanism and the second drive mechanism have a solenoid, and the solenoids of the first drive mechanism and the second drive mechanism are arranged adjacent to each other with a single magnetic plate member interposed therebetween.

\* \* \* \* \*